Nov. 26, 1968  W. C. BAUMAN  3,412,521
METHOD FOR PACKING ARTICLES
Filed Feb. 6, 1967
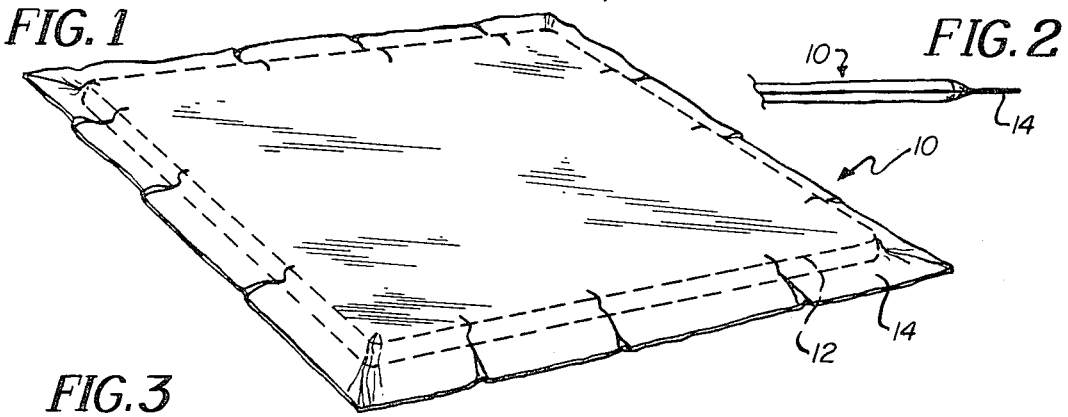
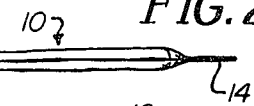
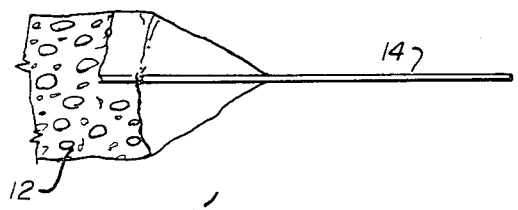
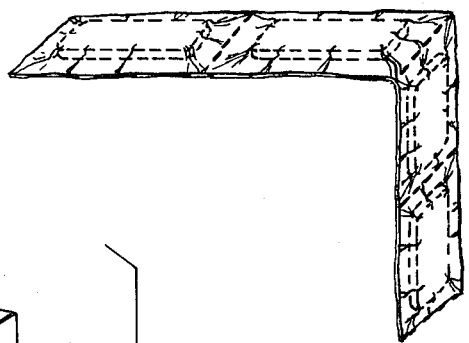
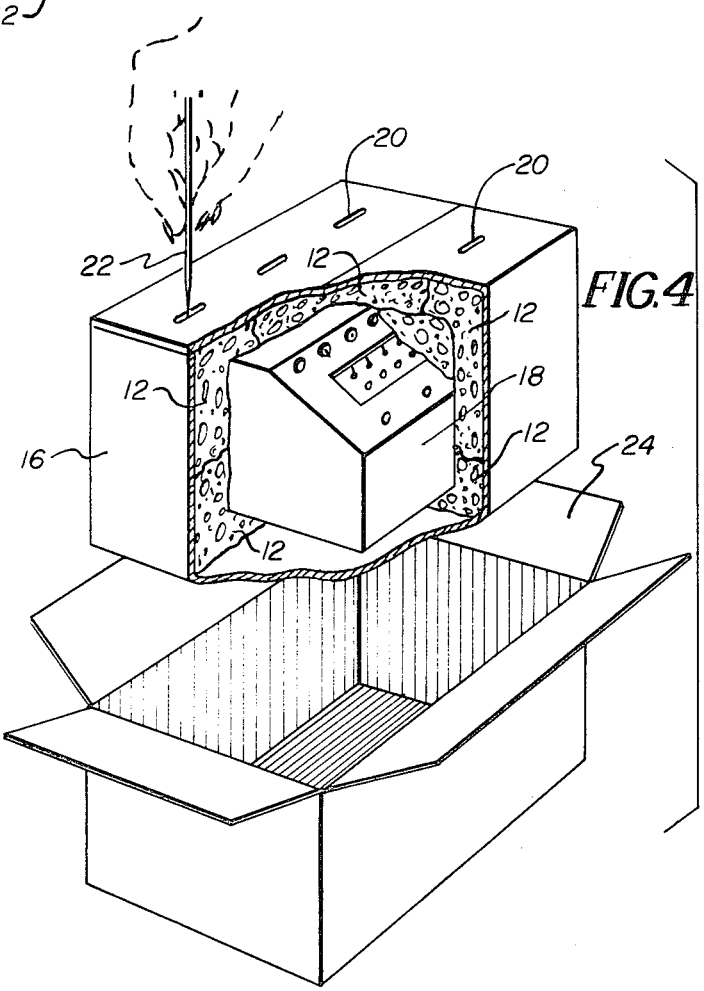
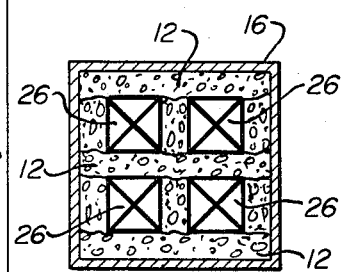
INVENTOR.
WILLIAM C. BAUMAN

United States Patent Office 3,412,521
Patented Nov. 26, 1968

3,412,521
METHOD FOR PACKING ARTICLES
William C. Bauman, Midland, Mich., assignor to The Dow Chemical Company, Midland, Mich., a corporation of Delaware
Continuation-in-part of application Ser. No. 347,910, Feb. 27, 1964. This application Feb. 6, 1967, Ser. No. 614,112
3 Claims. (Cl. 53—36)

ABSTRACT OF THE DISCLOSURE

A method for packing a fragile article by positioning sealed bags of compressed flexible synthetic foam about said article and then puncturing the bags whereby the compressed foam expands of its own volition to conform to a high degree to the shape of the article.

---

This application is a continuation-in-part of application Ser. No. 347,910, filed Feb. 27, 1964, now Patent No. 3,307,318.

This invention relates to a novel method for packing articles and the package obtained therefrom and more particularly, to a novel method and a package wherein a sealed bag of compressed flexible synthetic plastic foam is used for packing fragile articles in boxes, shipping cartons and the like, to prevent damage to the articles.

As disclosed in the parent application, a compact package of compressed synthetic plastic foam can be made by compressing a body of flexible synthetic plastic foam to a fraction of its normal volume, and then sealing it in a substantially vapor impermeable plastic bag. Such bagging may precede the compression step. Air is expelled from the bag by the application of a vacuum unless the compression substantially expels all the air. The bag is then sealed, preferably by heat sealing. Thereafter, atmospheric pressure outside of the bag maintains the foam in a compressed state. Only when the bag is opened or punctured to allow entry of air will the foam re-expand to its normal volume.

It should be noted that the foam must be of the flexible synthetic plastic type, such as flexible polyether, polyester, polyurethane, polyethylene, polypropylene, polyvinyl chloride and silicone foam. If non-flexible or if of the type that compresses into a rigid slab with no or little resiliency, such as cellulose sponge, the above phenomenon will not work.

The packaging industry has utilized plastic foam for packing fragile articles. This foam is of the rigid type and requires premolding. Therefore it is not capable of conforming to the shape of the article to the high degree desired in certain instances. Also, the premolding requirements add to the cost.

Flexible packing such as shredded newspaper, wood, sponge and the like, or sheets of cushioning such as sleeves or shredded wood, sealed air bubble containing film and the like and slabs of flexible sponge material such as polyurethane and polyether sponge have also been used. In each instance, however, the packing must be wrapped or positioned around the article while it is being compressed by the packer in order to allow for some re-expansion in the box or carton. Even then, the desired high degree of conformance to the shape of the article is not totally accomplished.

An object of this invention is to provide a unique method for packaging articles.

Another object is to provide a unique package for articles to protect the articles from damage due to rough handling.

Still another object is to provide a method of the above character particularly useful for packaging odd or irregular-shaped articles.

A further object is to provide a method of the above character which is fast, efficient and relatively inexpensive.

A still further object is to provide a method of the above character which protects the packaged articles from dust and moisture, as well as from damage due to rough handling.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

Broadly, the invention comprises a utilization of the uniquely packaged plastic foam of the above-identified patent application in a manner wherein the packaged foam is inserted into a box, shipping carton and the like about the article to be packaged. The foam is then expanded by opening or puncturing the bag. Such expansion causes complete filling of any voids, and in addition, provides a protective packing or padding for the article to protect it against damage. The bag provides a moisture-proof and dust-proof covering about the article, since it is of plastic and is tightly packed about the article.

By re-expanding the foam, only after the sealed bag has been placed in a useful position, such as in a box, shipping carton and the like, unique beneficial results are obtained. The expansion in situ acts to completely fill the box and, accordingly, it is especially suited for packaging of bulky articles wherein a tight support is desired and even necessary. Also, odd or irregular-shaped articles which are difficult to package can be satisfactorily packaged by utilizing the method of this invention. Articles which are to be "air-dropped," as from an airplane, are advantageously packaged utilizing the method of this invention.

For a fuller understanding of the nature and objects of the invention, reference should be had to the following detailed description taken in connection with the accompanying drawings in which:

FIG. 1 is a perspective view of a sealed bag of compressed synthetic plastic foam;

FIGS. 2 and 3 are partial side views of the sealed bag of compressed synthetic plastic foam, prior to and after expansion thereof, respectively;

FIG. 4 is an exploded perspective view, partially cut away, to illustrate the manner in which the sealed bags of synthetic plastic foam are used to protectively package an article;

FIG. 5 is a sectional view illustrating another method of using the bags of synthetic plastic foam to protectively package several articles in the same box, shipping carton and the like; and FIG. 6 is a perspective view of a continuous length of individual sealed bags of compressed synthetic plastic foam.

Similar reference characters refer to similar parts throughout the several views of the drawings.

As seen in FIGS. 1–3, the bag-compressed foam 10 consists of a slab of foam 12, in compressed condition, within a sealed plastic bag 14, the bag being substantially larger than the slab of foam. The atmospheric pressure outside the bag retains the foam in a compressed state. Substantially no moisture content should exist within the bag as this would detract from the ability of atmospheric pressure to keep the foam in a compressed state. Also, if an article is packaged in the manner described below, and permitted to remain packaged for an extended period of time, the moisture may have a deleterious effect on the article causing mildew or rust.

In FIG. 4, the unique package of this invention is illustrated. As shown, a layer or layers of the bags are located in the bottom of box 16, to provide sufficient padding or packing beneath the article being cushioned, such as the instrument cabinet 18, to protect it from damage when dropped or handled roughly. These layers of bags can be opened or punctured to permit the compressed foam to expand, either before or after the article is set on top of them.

After the article is placed in the box 16 on top of the bottom layers of bags, additional bags of the compressed foam are stuffed into the box, about the article, to provide packing on all of its sides. These bags may then be opened or punctured to permit the compressed foam to expand. With such procedure, the expanded foam snugly engages the article, and substantially fills all voids about the sides of the article.

Thereafter, additional bags of the compressed foam can be pre-expanded and packed about the top of the article. Alternatively, a layer, or layers, of the bags can be placed atop the article, and the box closed with a top having apertures 20 in it, if it be of wood or similar hard material. The bags are then opened by puncturing them with a pin 22 through apertures 20. If the box is of cardboard or the like, this can be accomplished by merely jabbing the pin 22 through the top and into the bags. Indeed, all the bags, those on the bottom, sides and top, may be punctured after the box has been closed.

It can be seen that the article will be padded or packaged in a manner such that it is virtually held in suspension between the layers of expanded foam. The expanded foam therefore functions as a cushion, to completely protect the article from any damage which could result due to droppage or rough handling. Also, since the bags are tightly packed in the box and completely surround and snugly engage the article, they provide a substantially moisture-proof and dust proof covering for the article.

After being packaged in a box 16 in the abovedescribed manner, the box 16 can be enclosed within another box or carton 24, if desired. Also, the carton 24 can be lined or padded with layers of the bags to provide still additional protection from damage.

As indicated above, it is found that articles such as delicate electronic equipment advantageously can be packaged using the bags of compressed foam for packing. In many cases, articles such as these are "air-dropped" on the battlefield and in remote areas. It is found that when packed in boxes in the above-described manner, this equipment can be dropped without damaging it.

It can be seen that the bags of compressed foam can be quickly packed into boxes, about the articles, since they only need be "crammed" into the box and then opened or punctured. This same feature makes them especially handy for packing or padding odd or irregular-shaped articles, since the bags are simply packed about the article and then expanded to fill all of the voids. Essentially, the bags conform themselves to the shape of the article, to completely pad the article.

In FIG. 5, there is illustrated a manner in which several, in the illustrated case, four, articles 26 can be protectively packaged. The bags are first placed beneath the articles and expanded. Next, two of the articles 26 are placed in the box and bags are packed around and over them, as illustrated. The other two articles are then placed in the box, and bags packed around and over them, in the same fashion. The expanded foam will completely protect the articles from damage due to droppage and from damage due to engaging one another.

The bags of compressed foam can be individual bags, as illustrated in FIG. 1, or they can be formed in a continuous length of individual bags, as illustrated in FIG. 6. In the latter case, the seams between the individual bags are formed sufficiently wide that as many of the bags as desired can be cut from the length of them by cutting them apart along the seams. Also, the bags and the plastic foam can be of various shapes, such as square, rectangular, circular and even pouch-shaped for better enclosure, and can be various sizes to fit within the various types of boxes and shipping cartons presently available. Advantageously, for padding on the top and bottom of the boxes, the bags and the foam can be formed of the same size so that they completely cover the top and bottom thereof. The bags can therefore be more easily and more quickly packed.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

Now that the invention has been described, what is claimed is:

1. A method for packing an article in a box, shipping carton and the like with flexible synthetic plastic foam for protecting the article from damage comprising the steps of placing sealed vapor impermeable plastic bags containing synthetic plastic foam in a compressed state by reason of atmospheric pressure on said bag, into said box, shipping carton and the like about said article so as to substantially completely surround said article, said bags being substantially larger than said foam, and subsequently puncturing said bags with a sharp object to permit reexpansion of said foam, of its own volition, whereby said article is substantially completely padded by said expanded foam.

2. The method of claim 1 whereby said steps involve placing at least one layer of said sealed vapor impermeable plastic bags containing synthetic plastic foam into the bottom of said box, shipping carton and the like, then placing said article into said box, shipping carton and the like atop said bags of expanded foam, then placing additional bags into said box, shipping carton and the like about and atop said article, and puncturing the bags during or after placing therein to permit re-expansion of the foam in said bags, whereby said article is substantially completely padded by said expanded foam.

3. The method of claim 2 wherein the additional bags placed atop said article are punctured to permit reexpansion of said foam before they are placed in said box, shipping carton and the like atop said article.

References Cited

UNITED STATES PATENTS

| 1,675,947 | 7/1928 | Reeves. | |
| 2,644,655 | 7/1953 | Kitch | 244—138 |
| 3,190,442 | 6/1965 | Gauss | 206—46 |
| 3,222,843 | 12/1965 | Schneider | 206—46 |
| 3,302,815 | 2/1967 | Morrison | 220—9 |

FOREIGN PATENTS

| 1,203,670 | 10/1965 | Germany. |

JOSEPH R. LECLAIR, *Primary Examiner.*

J. M. CASKIE, *Assistant Examiner.*